Patented May 8, 1923.

1,454,153

UNITED STATES PATENT OFFICE.

JOHN CARR, OF ESHER, AND ARTHUR BENJAMIN BRADLEY, OF FULHAM PARK, LONDON, ENGLAND.

PROCESS OF PREPARING SUGAR.

No Drawing.     Application filed February 28, 1920. Serial No. 362,007.

*To all whom it may concern:*

Be it known that we, JOHN CARR and ARTHUR BENJAMIN BRADLEY, subjects of the King of Great Britain and Ireland, residing, respectively, at Esher, in the county of Surrey, England, and Fulham Park, in the county of London, England, have invented Improvements Relating to Processes of Preparing Sugar, of which the following is a specification.

This invention has reference to the production of sugar having certain characteristics which render it specially suitable for the manufacture of chocolate.

Amorphous sugar ordinarily produced by the process and in the apparatus known as a transformer described in the specification of Letters Patent No. 957,113 though in some respects advantageous in comparison with ground crystal sugar so far as chocolate manufacture is concerned has not enabled any substantial reductions to be regularly made in either the percentage of cocoa butter that has to be added to facilitate the grinding and handling of the chocolate making ingredients or in the amount of grinding or milling of the ingredients required to produce equally refined and smooth chocolate.

Now according to this invention there is produced a sugar which is characterized by being in the main constituted of rounded, soft and easily crushed grains having dimensions of between one twentieth and one tenth of a millimetre, the sugar containing between two to three per cent of moisture and it may be, up to as much as five or six per cent of invert sugar or glucose. The preparation of sugar having such characteristics is effected in the manner hereinafter described, the size of grain and the moisture content being capable of control according to requirement by adjusting the conditions under which the sugar is prepared to suit the grade of sugar being treated.

In the manufacture of chocolate, which, as is well understood, is prepared from a mixture of cocoa liquor, sugar and added cocoa butter, the use of sugar of the character specified instead of ground crystal sugar or other prepared sugars enables the amount of added cocoa butter to be reduced by fifteen per cent, or more, whilst two refinings will result in a chocolate as smooth and finely ground as would be obtained with three refinings with other sugars. Possibly in comparison with some samples of transformer sugar hitherto obtainable, the advantages of using sugar of the character specified may not be quite so marked, but the hitherto unavoidable variations in transformer sugar have necessitated frequent modifications in the manufacture of the chocolate in which it is an ingredient in order that a product of reasonably constant quality and smoothness may be obtained.

In preparing sugar according to the present invention, apparatus such as that described in the specification of the Letters Patent hereinbefore referred to may be employed; raw or refined sugar or blended sugars are dissolved and heated with live steam in a blow up pan to form a solution of between 55° to 65° Brix, which, after being clarified and cleared of physical impurities by passage through one or more sieves of very fine wire gauze, is fed by a pump with an adjustable feed through a cooker consisting of a steam heated coil or equivalent. The temperature to which the sugar solution is cooked varies between 254° to 262° F., according to the grade of sugar used. The hot sugar solution, which has become concentrated, steam having been released, is then passed through the crystallization chamber or transformer wherein it is constantly stirred and beaten and whence the finished sugar is delivered. The proper cooking temperature may be determined by the appearance of the sugar during its passage through the transformer, and may be confirmed by examining the finished sugar microscopically. The sugar should have a free passage through the transformer and, the proper cooking temperature having been ascertained it should be kept within about 2° F. of that temperature. There should be no dust rising from the transformer and visible moisture should be given off as far as practical at the delivery end of the transformer, where the agitated sugar should appear light and not soggy nor in the form of a heavy powder. In other words, if dust rises from the material being treated, in say, the apparatus shown in the patent to Shaw, No. 957,113, the temperatures require adjustment, as they do also if moisture does not still come off from the material as far as or when it reaches about the section line C. D. of Fig. 4 of the Shaw drawing. If the cooking temperature is too low for the grade of sugar being treated the sugar will appear soggy whilst if it is too high the sugar will be heavy and dusty.

We have found that the range of cooking temperatures which will enable the desired results to be obtained is very limited, thus if the cooking temperature be substantially below 254° F., the final product will be very damp and will contain numerous large crystals together with irregular sized crystals. On the other hand, if the cooking temperature be substantially above 262° F., the sugar mass tends to become excessively hard in the transformer and forms a very heavy dry sugar consisting of small grains, together with hard masses of crystals cemented together. Sugars cooked at too low a temperature and sugars cooked at too high a temperature do not produce satisfactory chocolate and fail to realize the savings claimed so that the limits of temperature indicated above must be adhered to.

In carrying out the present invention, satisfactory sugar for making chocolate has been obtained with a transformer of the kind referred to twelve feet long with means for stirring, beating, breaking up and feeding forward the material, which means caused the material to pass through the full length of the transformer in 120 seconds (two minutes).

What we claim is:—

The herein described method of preparing sugar suitable especially for use in the manufacture of chocolate, which consists in producing a sugar solution of between 55° to 65° Brix, cooking the solution at a temperature not substantially below 254° nor substantially above 262° Fahr., then passing the hot solution through a transforming apparatus and maintaining it therein at a temperature within 20° of the cooking temperature, and stirring and beating it until it crystallizes in the form of rounded, soft and easily crushed grains having dimensions of between one-twentieth and one-tenth of a millimeter and containing from about two to three per cent of moisture and not more than six per cent of invert sugar.

Signed at 158, Drummond Road, Bermondsey, London, S. E., 16, this 5th day of February 1920.

JOHN CARR.
ARTHUR BENJAMIN BRADLEY.

Witness:
CLARA E. SAVAGE.